(12) United States Patent
Kakii

(10) Patent No.: US 9,940,080 B2
(45) Date of Patent: Apr. 10, 2018

(54) INFORMATION APPARATUS, COMMUNICATION MANAGEMENT METHOD, AND NON-TRANSITORY COMPUTER-READABLE MEDIUM

(71) Applicant: Hiroshi Kakii, Tokyo (JP)

(72) Inventor: Hiroshi Kakii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/477,310

(22) Filed: Apr. 3, 2017

(65) Prior Publication Data

US 2017/0300278 A1 Oct. 19, 2017

(30) Foreign Application Priority Data

Apr. 14, 2016 (JP) .................. 2016-081302

(51) Int. Cl.
*G06F 3/12* (2006.01)
*H04N 1/00* (2006.01)

(52) U.S. Cl.
CPC .......... *G06F 3/1239* (2013.01); *G06F 3/1222* (2013.01); *G06F 3/1236* (2013.01); *G06F 3/1238* (2013.01); *G06F 3/1286* (2013.01); *H04N 1/00244* (2013.01); *H04N 2201/0094* (2013.01)

(58) Field of Classification Search
CPC .... G06F 3/1239; G06F 3/1286; G06F 3/1238; G06F 3/1236; G06F 3/1222; H04N 1/00244; H04N 2201/0094
USPC ....................................... 358/1.15
See application file for complete search history.

(56) References Cited

U.S. PATENT DOCUMENTS

| 7,222,134 | B1 | 5/2007 | Maruyama et al. |
| 8,654,384 | B2* | 2/2014 | Kamomae ............... G06F 3/121 358/1.14 |
| 2005/0188196 | A1 | 8/2005 | Kakii |
| 2007/0208863 | A1* | 9/2007 | Otsuka ............... H04N 1/00222 709/227 |
| 2013/0038901 | A1* | 2/2013 | Shimadu ............ H04N 1/32096 358/1.15 |
| 2015/0254735 | A1 | 9/2015 | Hiroshi Kakil |

(Continued)

FOREIGN PATENT DOCUMENTS

JP 2007-174351 7/2007
JP 2011-034561 2/2011

*Primary Examiner* — Allen H Nguyen
(74) *Attorney, Agent, or Firm* — Harness, Dickey & Pierce, P.L.C.

(57) ABSTRACT

An information apparatus to communicate with one or more communication counterparts includes a memory and circuitry. The memory is configured to store an elapsed time condition in association with identification information for each of the one or more communication counterparts. The circuitry is configured to measure an elapsed time from the last time when communication took place with the communication counterpart for each of the one or more communication counterparts. The circuitry is further configured to extract identification information for which the measured elapsed time satisfies the elapsed time condition stored in the memory. The circuitry is further configured to determine whether to restrict communications between the information apparatus and at least one of the communication counterparts corresponding to the extracted identification information.

19 Claims, 10 Drawing Sheets

(56) References Cited

U.S. PATENT DOCUMENTS

2016/0028913 A1* 1/2016 Yoshida ............. H04N 1/00933
            358/1.15
2016/0150104 A1* 5/2016 Wagatsuma ....... H04N 1/00244
            358/1.15
2016/0342813 A1   11/2016 Kakii

* cited by examiner

FIG. 5

| REGISTERED IP ADDRESS | ADMINISTRATOR INPUT INFORMATION ||| DEVICE MANAGEMENT INFORMATION ||
| | STATUS-CHECK START TIME | DELETION-DETERMINATION CHECK TIME | CONDITION BASED ON RESPONSE RATIO | TIME ELAPSED FROM LAST ACCESS | PERMIT/DISAPPROVE |
| --- | --- | --- | --- | --- | --- |
| ... | ... | ... | ... | ... | ... |
| XXX.XXX.XXX.100 | 30d | 60d | DELETE IF EQUAL TO OR LESS THAN HALF | 24d | PERMIT |
| XXX.XXX.XXX.101 | 30d | 60d | DELETE IF NO RESPONSE | 35d | PERMIT |
| XXX.XXX.XXX.102 | 40d | 80d | DELETE IF NO RESPONSE | 48h | PERMIT |
| XXX.XXX.XXX.113 | 30d | 60d | DELETE IF EQUAL TO OR LESS THAN HALF | 36h | PERMIT |
| XXX.XXX.XXX.114 | 30d | 60d | DELETE IF NO RESPONSE | 59d | PERMIT |
| XXX.XXX.XXX.115 | 60d | 100d | DELETE IF EQUAL TO OR LESS THAN HALF | 25h | PERMIT |
| ... | ... | ... | ... | ... | ... |

| ACCESS INFORMATION | | |
|---|---|---|
| REGISTERED IP ADDRESS | LAST ACCESS TIME | RESPONSE COUNTER (NUMBER OF RESPONSES/ NUMBER OF TRIALS) |
| ... | ... | ... |
| XXX.XXX.XXX. 100 | 201xx-01-01 10:00 | 10/12 |
| XXX.XXX.XXX. 101 | 201xx-02-03 12:33 | 19/25 |
| XXX.XXX.XXX. 102 | 201xx-01-13 12:33 | 0/30 |
| XXX.XXX.XXX. 113 | 201xx-03-03 15:33 | 12/45 |
| ... | ... | ... |

FIG. 8

| REGISTERED IP ADDRESS | ADMINISTRATOR INPUT INFORMATION ||| DEVICE MANAGEMENT INFORMATION ||
| --- | --- | --- | --- | --- | --- |
| | STATUS-CHECK START TIME | DELETION-DETERMINATION CHECK TIME | CONDITION BASED ON RESPONSE RATIO | TIME ELAPSED FROM LAST ACCESS | PERMIT/DISAPPROVE |
| ... | ... | ... | ... | ... | ... |
| xxx.xxx.xxx.100 | 30d | 60d | DELETE IF EQUAL TO OR LESS THAN HALF | 20d | PERMIT |
| xxx.xxx.xxx.101 | 30d | 60d | DELETE IF NO RESPONSE | 38d | PERMIT |
| xxx.xxx.xxx.102 | 40d | 80d | DELETE IF NO RESPONSE | 10h | PERMIT |
| xxx.xxx.xxx.113 | 30d | 60d | DELETE IF EQUAL TO OR LESS THAN HALF | 20h | PERMIT |
| xxx.xxx.xxx.114 | 30d | 60d | DELETE IF NO RESPONSE | 62d | DISAPPROVE |
| xxx.xxx.xxx.115 | 60d | 100d | DELETE IF EQUAL TO OR LESS THAN HALF | 25h | PERMIT |
| ... | ... | ... | ... | ... | ... |

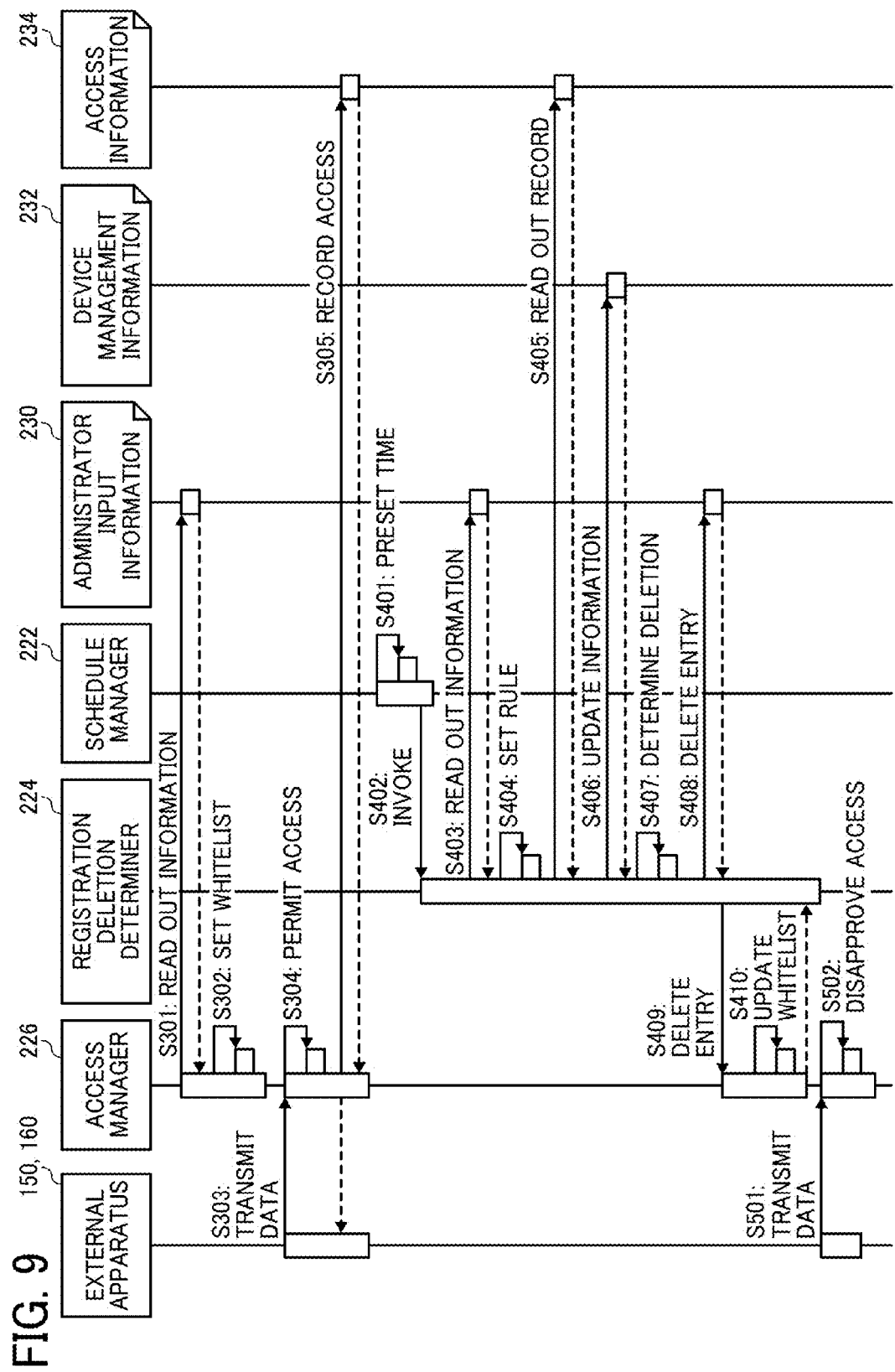

FIG. 10A

| REGISTERED IP ADDRESS | ADMINISTRATOR INPUT INFORMATION | | | DEVICE MANAGEMENT INFORMATION | | | |
|---|---|---|---|---|---|---|---|
| | STATUS-CHECK START TIME | DELETION-DETERMI-NATION CHECK TIME | CONDITION BASED ON RESPONSE RATIO | ELAPSED TIME FROM LAST RECEPTION | ELAPSED TIME FROM LAST TRANSMISSION | TRANS-MISSION PERMIT/ DISAPPROVE | RECEP-TION PERMIT/ DISAPPROVE |
| ... | ... | ... | ... | ... | ... | ... | ... |
| XXX.XXX.XXX.100 | 30d | 60d | DELETE IF EQUAL TO OR LESS THAN HALF | 24h | 15h | PERMIT | PERMIT |
| XXX.XXX.XXX.101 | 30d | 60d | DELETE IF NO RESPONSE | 35d | 35d | PERMIT | PERMIT |
| ... | ... | ... | ... | ... | ... | ... | ... |

FIG. 10B

| REGISTERED IP ADDRESS | ACCESS INFORMATION | | | |
|---|---|---|---|---|
| | LAST TRANSMISSION TIME | LAST RECEPTION TIME | RESPONSE COUNTER FOR TRANSMISSION (NUMBER OF RESPONSES/ NUMBER OF TRIALS) | RESPONSE COUNTER FOR RECEPTION (NUMBER OF RESPONSES/ NUMBER OF TRIALS) |
| ... | ... | ... | ... | ... |
| XXX.XXX.XXX.100 | 201xx-01-01 10:00 | 201xx-01-02 10:55 | 10/12 | 10/12 |
| XXX.XXX.XXX.101 | 201xx-02-03 12:33 | 201xx-01-03 17:33 | 19/25 | 19/25 |
| ... | ... | ... | ... | ... |

INFORMATION APPARATUS, COMMUNICATION MANAGEMENT METHOD, AND NON-TRANSITORY COMPUTER-READABLE MEDIUM

CROSS-REFERENCE TO RELATED APPLICATIONS

This patent application is based on and claims priority pursuant to 35 U.S.C. § 119(a) to Japanese Patent Application No. 2016-081302, filed on Apr. 14, 2016 in the Japan Patent Office, the entire disclosure of which is hereby incorporated by reference herein.

BACKGROUND

Technical Field

The present disclosure relates to an information apparatus, a method for managing communication, and a non-transitory computer-readable medium.

Description of the Related Art

At offices, only certain users identified with a user identifier and a password can use information apparatuses such as multifunction peripherals. By contrast, at facilities such as libraries and municipal offices, a large number of users use the information apparatuses, and its use is temporary in many cases. In this case, if permission to use the information apparatus is given on a user-by-user basis, a burden on the users or administrators could increase. To address this issue, information apparatuses are known that include an address filtering function, enabling identification of terminals that can use the apparatuses based on an address such as an IP address. The address filtering function can eliminate the necessity of registration and management of the user identifiers and passwords for only temporary use of printing functions, while preventing the information terminal from being used by any terminal other than specified terminals.

This address filtering function has no problem at the start of operation. However, after some time since the start of operation, it becomes difficult to distinguish terminals that are still in use from terminals that are no longer in use. The address filtering function gives an exceptional permission for use to a certain apparatus. For this reason, it is preferable to invalidate the permission for use given to a terminal that is no longer in use in a timely manner.

SUMMARY

An information apparatus to communicate with one or more communication counterparts includes a memory and circuitry. The memory is configured to store an elapsed time condition in association with identification information for each of the one or more communication counterparts. The circuitry is configured to measure an elapsed time from the last time when communication took place with the communication counterpart for each of the one or more communication counterparts. The circuitry is further configured to extract identification information for which the measured elapsed time satisfies the elapsed time condition stored in the memory. The circuitry is further configured to determine whether to restrict communications between the information apparatus and at least one of the communication counterparts corresponding to the extracted identification information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is an illustration of an example data structure of administrator input information and device management information stored in the MFP at a certain timing according to an embodiment of the present invention;

FIG. 8 is an illustration of an example data structure of the administrator input information and the device management information stored in the MFP at another timing according to an embodiment of the present invention;

FIG. 9 is a sequence diagram illustrating processes performed among modules in the registration deletion determination processing performed by the MFP according to an embodiment of the present invention;

FIG. 10A is an illustration of an example data structure of the administrator input information and the device management information stored in the MFP according to another embodiment of the present invention;

FIG. 10B is an illustration of an example data structure of the access information according to another embodiment of the present invention.

Figure 1:
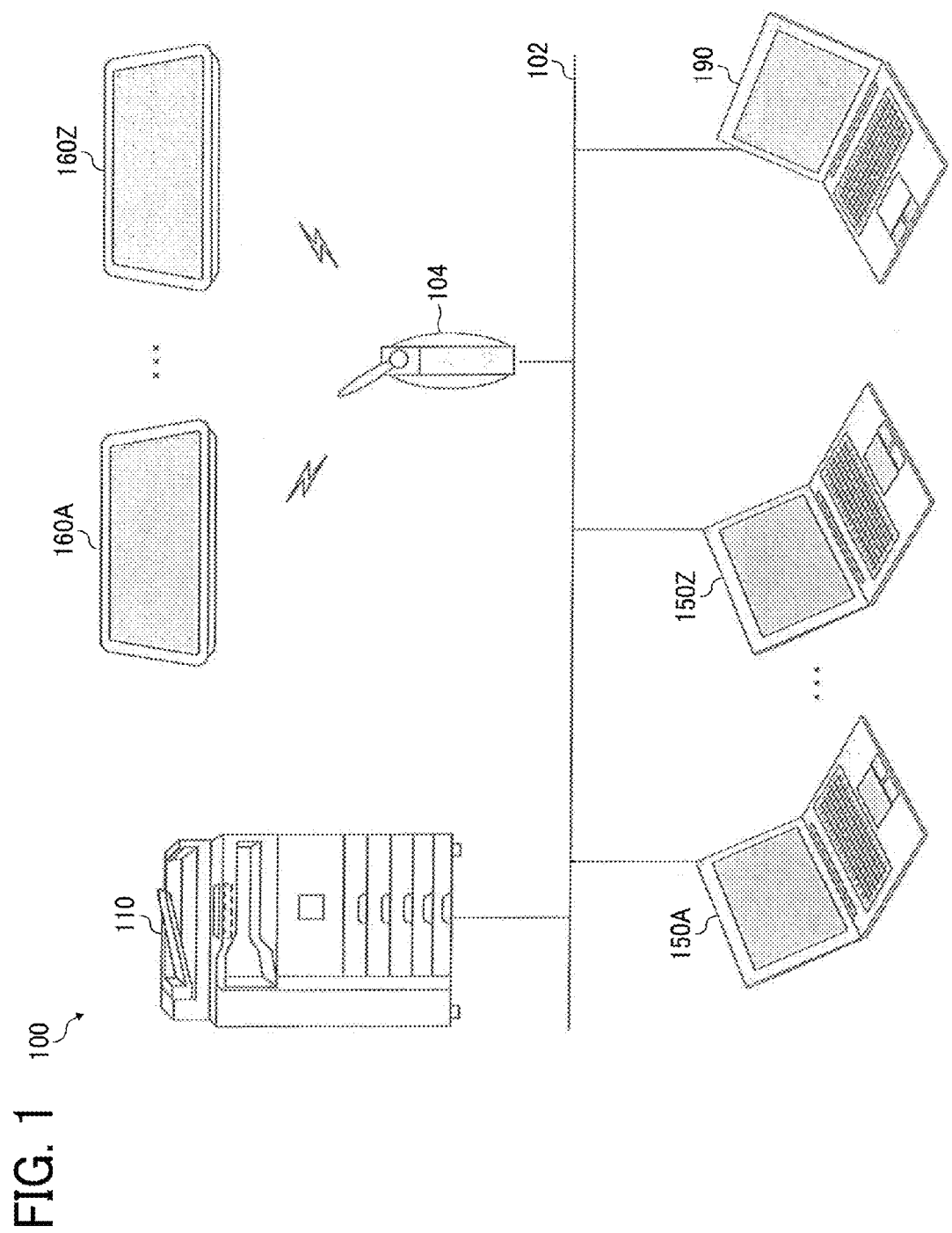
FIG. 1 is a schematic diagram illustrating a usage environment where a multifunction peripheral (MFP) is placed according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of an example in which a multifunction peripheral 110 is an example of an information apparatus.

FIG. 1 is a schematic diagram illustrating a usage environment 100 where the multifunction peripheral 110 is placed according to the present embodiment. The usage environment 100 illustrated in FIG. 1 includes the multifunction peripheral (MFP) 110, user terminals 150A to 150Z and user terminals 160A to 160Z, and an administrator terminal 190. There may be any suitable number of user terminals, provided that there is at least one user terminal. In the following description, any arbitrary one or more user terminals 150A to 150Z may be collectively referred to as the user terminal 150, in order to simplify description. In addition, any arbitrary one or more user terminal 160A to 160Z may be collectively referred to as the user terminal 160, in order to simplify description. The MFP 110 is an example of an information apparatus to be used by a user. The user terminals 150 and 160 are each operated by the user when the user is to use the MFP 110. The administrator terminal 190 is operated by an administrator who administers the MFP 110.

In the usage environment 100 illustrated in FIG. 1, the MFP 110, the user terminals 150A to 150Z, and the administrator terminal 190 are connected to a network 102 such as a local area network. In addition, the user terminals 160A to 160Z are connected to the network 102 via an access point 104 implementing wireless communication. In any form, an IP address, which is, for example, static, is allocated to each of the MFP 110, the user terminals 150, the user terminals 160, and the administrator terminal 190.

The MFP 110 is an information apparatus that provides a user with various image services such as printing, scanning, and facsimile communication. Examples of the user terminal 150 and the user terminal 160 include a general-purpose computer such as a desktop computer, a laptop computer, and a tablet computer and a mobile information terminal. When the user wants to print out something, the user operates any one of the user terminals 150 and the user terminal 160 to send a print job to the MFP 110. Further, when the user wants to perform scan transmission, the user operates the MFP 110 to request a scan job that instructs a transfer of scanned images to a shared folder on the user terminal 150 or the user terminal 160 that the user uses.

Although in FIG. 1, the MFP 110 is illustrated as an example of an information apparatus to be used by the user, any suitable information apparatus may be used. For example, the information apparatus may be any suitable information apparatus, provided that it could be accessed from an external apparatus or it could access an external apparatus. Examples of the information apparatus may include an image forming apparatus such as a laser printer, an image reading apparatus such as a scanner, an image communication apparatus such as a facsimile, a picture projecting apparatus such as a projector, a picture display apparatus, a server apparatus, a remote conference terminal, an electronic whiteboard, a mobile information terminal, an image capturing apparatus, a vending machine, a medical equipment, a power supply apparatus, an air-conditioning system, a measuring apparatus for measuring gas, water, electricity and the like, and a network home appliance such as a refrigerator and a washing machine.

Examples of the administrator terminal 190 include a general-purpose computer such as a desktop computer, a laptop computer, and a tablet computer and a mobile information terminal. The administrator uses the administrator terminal 190 to access the MFP 110 to configure various settings of the MFP 110 or to receive various notifications from the MFP 110.

In the usage environment 100, the MFP 110 includes an IP address filtering function that implements access restriction based on an IP address allocated to each terminal such that one or more specific user terminals 150, user terminals 160, and administrator terminals 190 can communicate with the MFP 110. The IP address filtering function may be referred to as just an "IP filtering function" hereinafter. Further, in the following description, the user terminal 150 and the user terminal 160 may be collectively referred to as an "external apparatus", in order to simplify the description.

This IP filtering function requires a group of IP addresses to be registered first. After some time since the registration and start of operation, it becomes difficult for the administrator to distinguish terminals that are still in use from terminals that are no longer in use in a simple manner. In some cases, more than 100 terminals are registered depending on a size of facilities. The larger number of terminals registered, the more difficult the management. The IP filtering function is a function that gives an exceptional permission for use to a certain terminal. For this reason, it is preferable to invalidate the permission for use given to a terminal that is no longer in use in a timely manner.

To address this issue, the MFP 110 according to the present embodiment records a communication status in association with each of the IP addresses of the user terminals 150 and the user terminals 160 as communication counterparts, and measures a time elapsed since the latest communication with the communication counterpart. The MFP 110 extracts, from the registered IP addresses, an IP address for which the measured elapsed time satisfies a predetermined condition that triggers a determination as to whether to restrict communication with the communication counterpart. Further, the MFP 110 determines whether to restrict the communication with the communication counterpart corresponding to the extracted IP address or permit the continuation of the communication. When the MFP 110 determines that the communication with the communication counterpart corresponding to the extracted IP address should be restricted, the MFP 110 may delete the IP address from a whitelist as permission information defining the IP addresses of the communication counterparts from which transmission data is permitted. In addition, the MFP 110 may send, to the administrator terminal 190, a request requesting the administrator to confirm whether the communication should be restricted as needed.

This configuration enables an efficient specification of the IP address of the communication counterpart that is no longer in use based on the predetermined condition and a timely determination as to whether to restrict the communication with the communication counterpart corresponding to the specified IP address.

Figure 2:
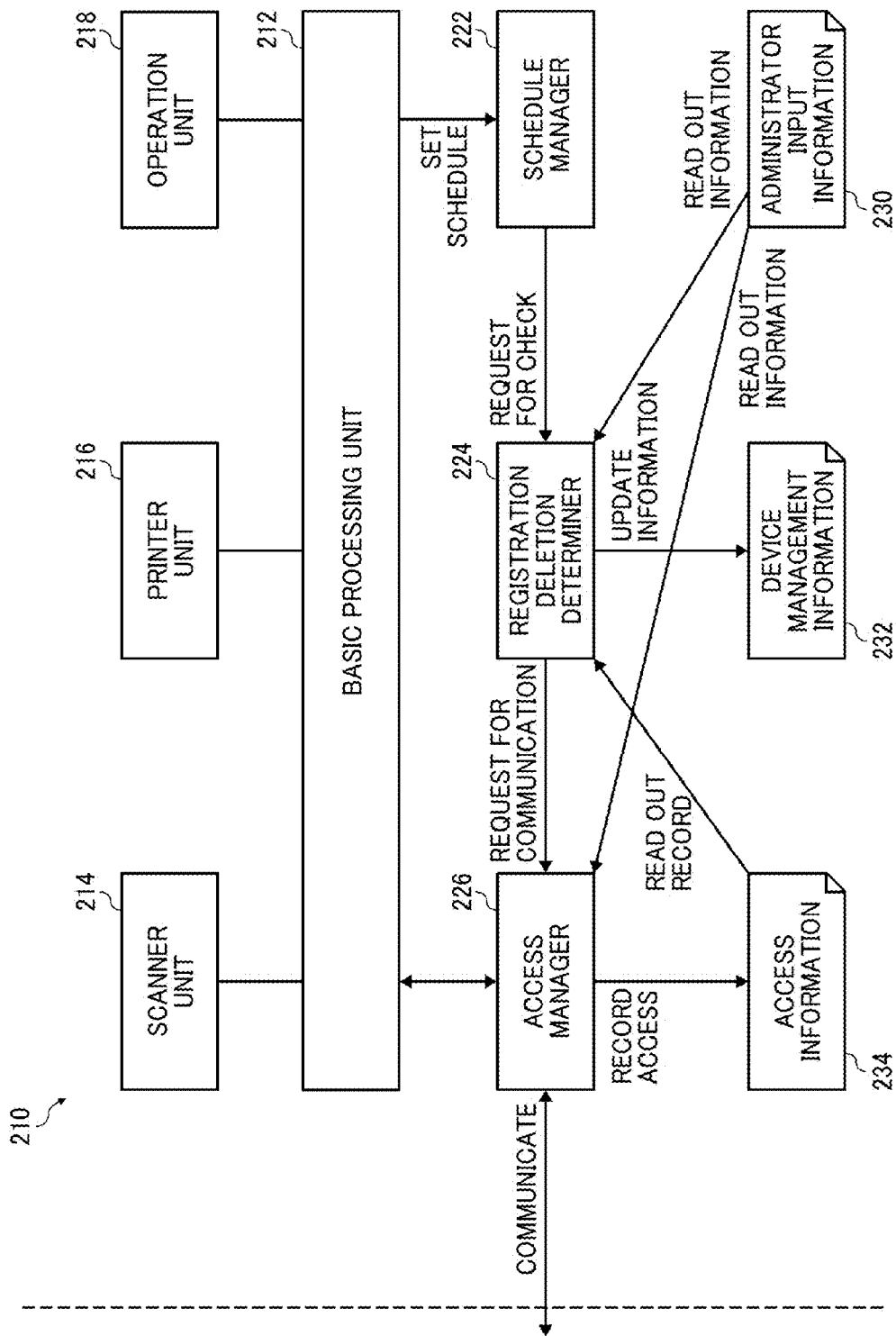
FIG. 2 is a block diagram illustrating a functional configuration of the MFP according to an embodiment of the present invention.

Hereinafter, a detailed description is given of an access management function implemented by the MFP 110 according to the present embodiment with reference to FIGS. 2 to 9. FIG. 2 is a block diagram illustrating a functional block 210 of the MFP 110 according to the present embodiment. Although a description is given below of an example in which the MFP 110 is an example of the information apparatus, any information apparatus other than the MFP 110 may be implemented by appropriately adding or deleting one or more modules to or from the functional block 210 illustrated in FIG. 2.

The functional block 210 of the MFP 110 illustrated in FIG. 2 includes a basic processing unit 212, a scanner unit 214, a print unit 216, an operation unit 218, a schedule manager 222, a registration deletion determiner 224, and an access manager 226. In FIG. 2, administrator input information 230, access, and access information 234 are also illustrated, which are stored in a storage device such as a hard disc drive (HDD) 64 and a non-volatile random access memory (NV-RAM) 26 illustrated in FIG. 11.

The scanner unit 214 includes an image reading unit and performs image reading in image processing services such as copying and scanning. The print unit 216 includes an image forming unit and performs image formation in image processing services such as copying and printing. The operation unit 218 includes a touch panel operated by a user of the MFP 110. The operation unit 218 provides a user interface that accepts various user operations such as a login operation, a job execution instruction, and a logout operation via a panel. The basic processing unit 212 controls an entire operation of the MFP 110 including the scanner unit 214, the print unit 216, and the operation unit 218.

Although FIG. 2 illustrates an example in which the MFP 110 includes the scanner unit 214, the print unit 216, and the operation unit 218, a configuration of the information apparatus not limited to the configuration illustrated in FIG. 2. For example, the information apparatus may include other modules such as a facsimile unit or may not include a part of the above-described modules, provided that it includes suitable functions depending on specific purposes or product designs, etc.

The access manager 226 is implemented by, for example, a network interface card (NIC) and manages communications between the MFP 110 and the external apparatus. In the present embodiment, the access manager 226 implements the IP filtering function to determine whether the external apparatus is a permitted communication counterpart when data communication between the MFP 110 and the external apparatus occurs. When the access manager 226 determines that the external apparatus is permitted to communicate with the MFP 110, the access manager 226 transfers a packet to the basic processing unit 212. By contrast, when the access manager 226 determines that the external apparatus is not permitted to communicate with the MFP 110, the access manager 226 ignores the packet or sends a denial packet back to the external apparatus.

When the packet is ignored, the communication is terminated at the external apparatus due to timeout. By contrast, when the denial packet is sent back, the external apparatus can recognize that the access is denied because the communication is terminated explicitly.

The access permission or disapproval is defined in advance in the administrator input information 230. When the MFP 110 is start up, for example, the access manager 226 reads out the whitelist including at least one registered IP address from the administrator input information 230 to configure a table on a memory such as a system memory 56 and a local memory 62 illustrated in FIG. 11 to perform determination at the time of communication. The administrator input information 230 constitutes a memory to store conditions regarding the elapsed time that triggers determination as to whether to restrict communication with the communication counterpart.

In the present embodiment, in response to an occurrence of data communication, the access manager 226 records, in the access information 234, an IP address of the communication counterpart and a period of time during which the MFP 10 and the communication counterpart communicate data with each other.

The schedule manager 222 calls the registration deletion determiner 224 periodically or any desired time according to a predefined schedule to cause the registration deletion determiner 224 to start determination of deletion of one or more registered IP addresses by the IP filtering function. The schedule manager 222 is set up with a schedule in advance in accordance with an instruction given by the administrator via the operation unit 218. The schedule may define the call to be performed periodically such as every hour, every day, every 17 o'clock, and at 17 o'clock on every Friday. Alternatively, the schedule may define the call to be performed at irregular intervals by an event activation such as a start-up of the MFP 110 or a transition from an energy saving mode.

In response to the call from the schedule manager 222, the registration deletion determiner 224 performs the determination of deletion of one or more registered IP addresses from the whitelist by the IP filtering function.

Figure 3:
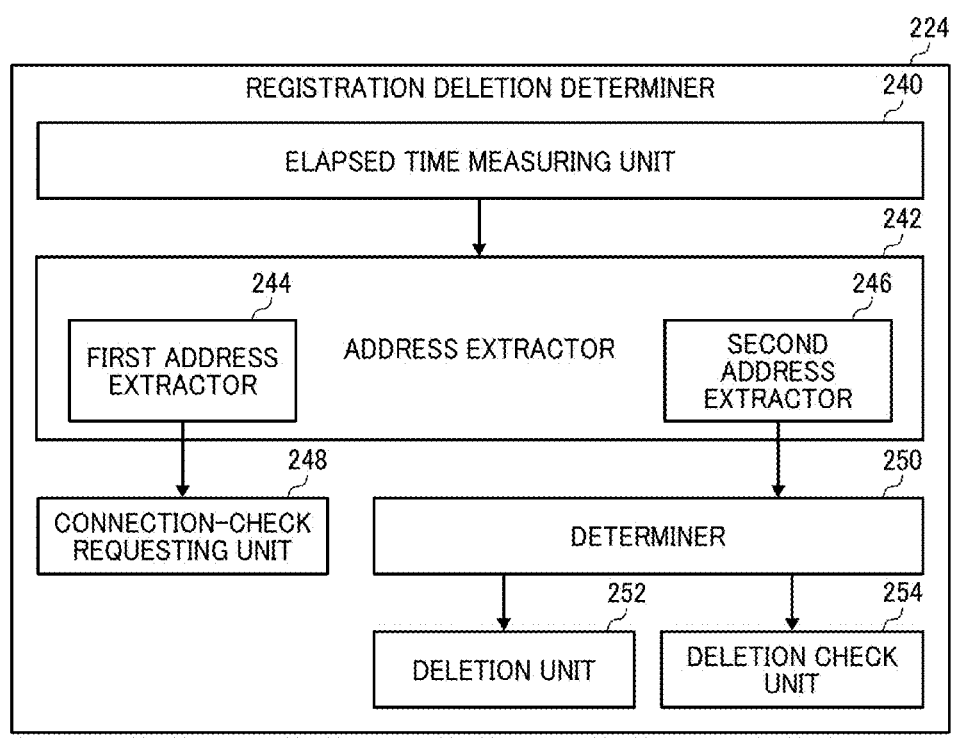
FIG. 3 is a block diagram illustrating a detailed functional configuration of a registration deletion determiner of the MFP according to an embodiment of the present invention.

FIG. 3 is a block diagram illustrating a detailed functional configuration of the registration deletion determiner 224 of the MFP 110 according to the present embodiment. As illustrated in FIG. 3, the registration deletion determiner 224 includes an elapsed time measuring unit 240, an address extractor 242, a connection-check requesting unit 248, a determiner 250, a deletion unit 252, and a deletion check unit 254.

The elapsed time measuring unit 240 measures, for each of the IP addresses of the communication counterparts, a time elapsed since the latest communication between the MFP 110 and the communication counterpart. The address extractor 242 determines, based on the measured elapsed time, whether each of the IP addresses of the communication counterparts satisfies the predetermined condition to extract an IP addresses that satisfy the predetermined condition.

In the present embodiment, the address extractor 242 includes a first address extractor 244 and a second address extractor 246 to perform the determination in two steps. The first address extractor 244 extracts an IP address for which the measured elapsed time exceeds a period of time defining a time at which a check of a connection status is to be started. This period of time defining a time at which the check of the connection status is to be started is referred to as a "status-check start time" hereinafter. The second address extractor 246 extracts an IP address for which the measured elapsed time exceeds a period of time defining a time at which determination is to be performed as to whether the extracted IP address should actually be deleted. This period of time defining a time at which the determination is to be performed as to whether the extracted IP address should actually be deleted is referred to as a "deletion determination check time" hereinafter. The condition such as the status-check start time and the deletion determination check time is defined in advance by the administrator and stored in the administrator input information 230.

In a case in which an IP address for which the measured elapsed time exceeds the status-check start time is extracted, the connection-check requesting unit 248 requests the access manager 226 to check the connection status. The access manager 226 transmits a request for connection check to the user terminal 150 or the user terminal 160 as a communication counterpart corresponding to the extracted IP address. Further, the access manager 226 records a result of the connection check in the access information 234. In a case in which an IP address for which the measured elapsed time exceeds the deletion determination check time is extracted, the determiner 250 determines whether to actually restrict the communication between the MFP 110 and the user terminal 150 or the user terminal 160 corresponding to the extracted IP address based on the results of the connection checks performed so far.

In a specific embodiment, when the determiner 250 determines that the communication should be restricted, the deletion unit 252 may delete the extracted IP address from the whitelist to restrict the communication. The information regarding the IP address that is deleted from the whitelist is deleted from the administrator input information 230 or the device management information 232. Alternatively, a deletion flag is set. The deletion check unit 254 may request the administrator to confirm whether to restrict the communication between the MFP 110 and the user terminal 150 or 160 corresponding to the IP address for which the determiner 250 determines not to restrict the communication as a connection status is confirmed.

Figure 4:
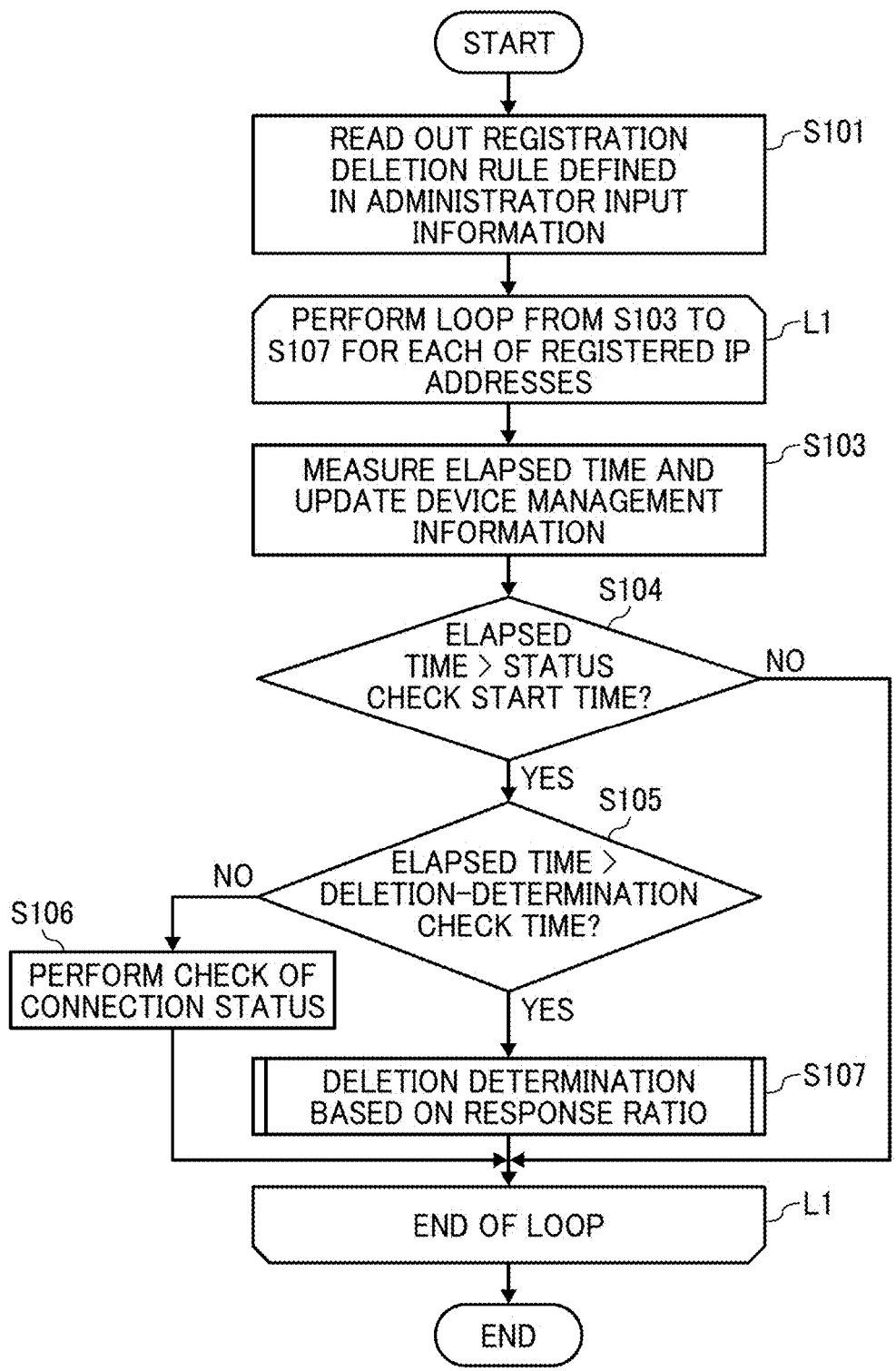
FIG. 4 is a flowchart illustrating steps in registration deletion determination processing performed by the MFP according to an embodiment of the present invention.

Hereinafter, a more detailed description is given of the access management function implemented by the MFP 110 according to the present embodiment with reference to FIGS. 4 to 9. FIG. 4 is a flowchart illustrating steps in determination of deletion of one or more registered IP addresses performed by the MFP 110 according to the present embodiment. More specifically, the operation of the flowchart of FIG. 4 is performed by the registration deletion determiner 224.

The registration deletion determiner 224 starts the operation illustrated in FIG. 4 in response to receiving a call from the schedule manager 222. The administrator registers one or more IP addresses and sets a registration deletion rule. Thereafter, the administrator designates an execution schedule to cause a routine of the determination of deletion of one or more registered IP addresses to operate periodically or any desired time. First, at S101, the registration deletion determiner 224 reads out the registration deletion rule from the administrator input information 230.

FIG. 5 is an illustration of an example data structure of the administrator input information 230 and the device management information 232 stored in the MFP 110 at a certain timing according to the present embodiment. As illustrated in FIG. 5, the administrator input information 230 includes the registered IP address, the status-check start time, the deletion determination check time, and a condition for a response ratio.

The registered IP address is an IP address of the user terminal 150 or the user terminal 160 as a communication counterpart that is registered in the whitelist to permit an access. The IP address is a target of the determination of the deletion. The status-check start time defines a time at which the check of the connection status is to be started, as described above. In a case in which an elapsed time since the last access exceeds the status-check start time at a time when the operation illustrated in FIG. 4 is performed, the check of the connection status is performed each time. The deletion determination check time defines a time at which the determination is to be performed as to the registration of the IP address should be deleted, as described above. In a case in which the elapsed time exceeds the deletion determination check time at a time when the operation illustrated in FIG. 4 is performed, the determination is performed as to whether the registration of the IP address should be deleted. The condition for a response ratio describes an automatic deletion condition based on which the registration is deleted without an inquiry to the administrator or the administrator's approval when determining the deletion of the registration. This automatic deletion condition is associated with the response ratio, which is a ratio of the number of responses to the connection check to the number of trials of the connection check.

Referring to an example illustrated in FIG. 5, the rule is set such that the connection check is started for a registered IP address of xxx.xxx.xxx.100 if 30 days have passed since the last access. Further, the rule defines that, for the same registered IP address of xxx.xxx.xxx.100, the determination is performed as to whether the IP address should be deleted from the whitelist if 60 days have passed since the last access. Furthermore, according to this rule, the IP address of xxx.xxx.xxx.100 should be automatically deleted if 60 days have passed since the last access and the responses are not made to more than or equal to half of the connection checks performed after 30 days since the last access.

Although in FIG. 5, the status-check start time and the deletion determination check time as the condition as to the elapsed time is set to each IP address of the user terminal 150 or the user terminal 160 as a communication counterpart, they may be collectively set to all of the registered IP addresses. Alternatively, different conditions may be set respectively to different groups of the registered IP addresses. In addition, these administrator input information 230 are usually registered at the start of operation or the reappraisal of operation. A description is given later of the device management information 232 illustrated in FIG. 5.

Referring again to FIG. 4, a processing loop L1 from S103 to S107 is performed for each of the IP addresses that are currently registered in the administrator input information 230.

At S103, the registration deletion determiner 224 measures, for one of the registered IP addresses as a current processing target, an elapsed time since the last access based on the access information 234 to update the device management information 232.

Figures 6, 7:
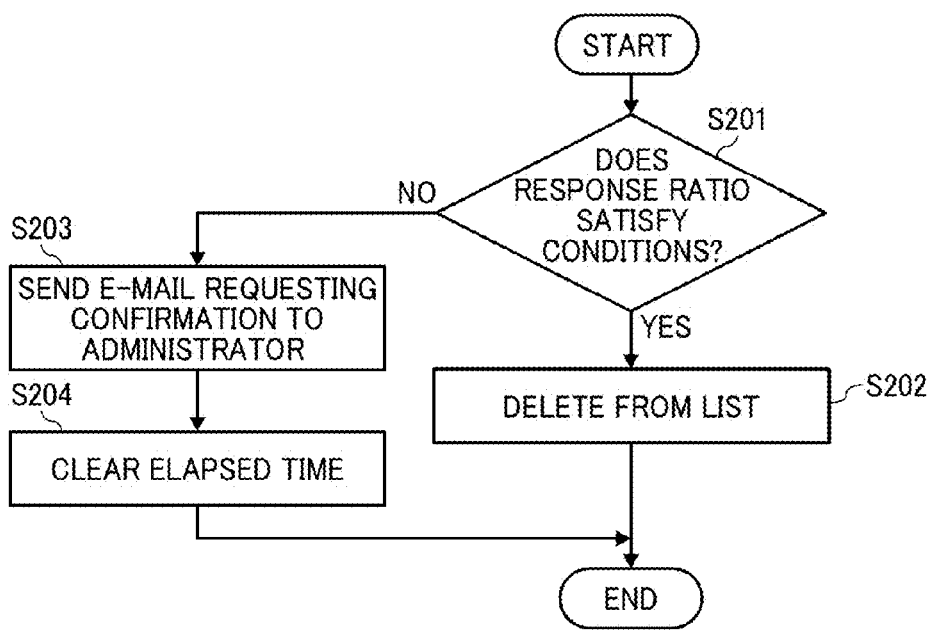
FIG. 6 is an illustration of an example data structure of access information managed in the MFP according to an embodiment of the present invention.
FIG. 7 is a flowchart illustrating deletion determination processing based on a response rate performed by the MFP according to an embodiment of the present invention.

FIG. 6 is an illustration of an example data structure of the access information 234 stored in the MFP 110 according to the present embodiment. As illustrated in FIG. 6, the access information 234 includes the registered IP address, a last access time, and a response counter. The registered IP address identifies the user terminal 150 or the user terminal 160 that has accessed the MFP 110. The last access time indicates a date and time at which the user terminal 150 or the user terminal 160 last accessed the MFP 110. The response counter holds the total number of trials of the connection check and the number of responses given back from the user terminal 150 or the user terminal 160 to the connection check.

More specifically, at S103, the registration deletion determiner 224 measures a current date and time and reads out the last access time corresponding to the IP address as the current processing target from the access information 234 to calculate a difference between the current time and the last access time. Thus, the elapsed time since the last access is measured. It should be noted that the access manager 226 updates the last access time in the access information 234 each time the user terminal 150 or the user terminal 160 accesses the MFP 110.

At S104, the registration deletion determiner 224 determines whether the measured elapsed time exceeds the status-check start time. When the registration deletion determiner 224 determines that the elapsed time does not exceed the status-check start time (S104: NO), the processing loop L1 ends for the IP address as the current processing target. Then, the processing loop L1 is performed for a next one of the registered IP addresses. By contrast, when the registration deletion determiner 224 determines that the elapsed time exceeds the status-check start time (S104: YES), the operation proceeds to S105.

At S105, the registration deletion determiner 224 determines whether the measured elapsed time exceeds the deletion determination check time. When the registration deletion determiner 224 determines that the elapsed time does not exceed the deletion determination check time (S105: NO), the operation proceeds to S106. At S106, the registration deletion determiner 224 causes the access manager 226 to perform the connection status check, and the processing loop L1 for the IP address as the current processing target ends. Then, the processing loop L1 is performed for a next one of the registered IP addresses.

More specifically, in the connection status check performed at S106, the registration deletion determiner 224 issues, to the access manager 226, a communication request directed to the IP address as the current processing target. For example, in response to receiving the connection request, the access manager 226 sends a message requesting a response to the user terminal 150 or the user terminal 160 as the communication counterpart to check the connection status. If the response is given back from the communication counterpart, it is confirmed that the communication counterpart is connected to the network 102 and the power is on. Examples of the message requesting a response from the communication counterpart include, but not limited to, a Ping command. In an alternative embodiment, a program configured to give a response back to a predetermined message may be resident in the user terminal 150 or the user terminal 160.

In addition, the connection check may be performed once or multiple times each time the operation illustrated in FIG. 4 is called. Alternatively, a schedule may be configured such that the connection check is performed with certain frequency. It should be noted that the access manager 226 increments the total number of trials of the response counter in the access information 234 each time the connection check is performed. Further, the access manager 226 increment the number of responses each time a successful response is given back to the connection check.

By contrast, when the registration deletion determiner 224 determines that the elapsed time exceeds the deletion determination check time (S105: YES), the operation proceeds to S107. At S107, a deletion determination processing based on the response ratio corresponding to the IP address as the current processing target is called. When the operation returns from the deletion determination processing, the processing loop L1 for the IP address as the current processing target ends. Then, the processing loop L1 is performed for a next one of the registered IP addresses. A description is given later of the deletion determination processing called at S107 with reference to FIG. 7.

When the processing loop L1 is performed for all of the registered IP addresses, the operation ends. By performing the processing loop L1 from S103 to S107 for all of the registered IP addresses, one or more IP address satisfying the conditions, specifically, one or more IP addresses for which the elapsed time reaches the status-check start time and one or more IP addresses for which the elapsed time reaches the deletion determination check time are extracted. Further, each of the connection status check and the deletion determination processing based on the response ratio is performed on the extracted IP address.

FIG. 7 is a flowchart illustrating the deletion determination processing based on the response rate performed by the MFP 110 according to the present embodiment. The operation illustrated in FIG. 7 is started in response to the call of the processing at S107 illustrated in FIG. 4.

First, at S201, the registration deletion determiner 224 reads out the response rate associated with the IP address as the current processing target in the access information 234 to determine whether the read-out response rate satisfies the condition stored in the administrator input information 230.

When the registration deletion determiner 224 determines that the response rate satisfies the condition (S201: YES), the operation proceeds to S202. At S202, the registration deletion determiner 224 deletes the IP address as the current processing target from the list of the registered IP addresses of the IP filter, and the deletion determination processing ends. Then, the operation returns to the processing illustrated in FIG. 4. The IP address as the current processing target is also deleted from the administrator input information 230 and the device management information 232 illustrated in FIG. 5. Further, the IP address is also appropriately deleted from the table configured on the memory by the access manager 226.

By contrast, when the registration deletion determiner 224 determines that the response rate does not satisfy the condition (S201: NO), the operation proceeds to S203. At S203, the registration deletion determiner 224 requests the administrator to confirm whether to restrict the communication between the MFP 110 and the user terminal 150 or the user terminal 160 corresponding to the IP address. For example, the registration deletion determiner 224 sends an email or an instant message requesting the confirmation to the administrator terminal 190. At S204, the registration deletion determiner 224 clears the elapsed time associated with the IP address in the device management information 232 to zero, and the deletion determination processing ends. Then, the operation returns to the processing illustrated in FIG. 4.

For example, in a case in which the condition for the response rate is "DELETE IF NO RESPONSE", it means that the IP address is deleted when no response is received from the user terminal 150 or the user terminal 160 corresponding to the IP address. Accordingly, in this example, when one or more responses are received from the user terminal 150 or the user terminal 160, the registration deletion determiner 224 sends, to the administrator terminal 190, an email, for example, requesting to determine whether to delete the IP address. Further, the elapsed time is cleared to zero and the measurement of the elapsed time is again started from zero.

Hereinafter, a description is given of an example of the change of the administrator input information 230 and the device management information 232 and how the registered IP is deleted by the access management function according to the present embodiment with reference to FIGS. 5 and 8. As described above, FIG. 5 illustrates an example data structure of the administrator input information 230 and the device management information 232 stored in the MFP 110 at a certain timing. FIG. 8 illustrates an example data structure of the administrator input information 230 and the device management information 232 stored in the MFP 110 at another timing according to the present embodiment.

Referring to the examples illustrated in FIGS. 5 and 8, the rule is set such that the connection check is started for a registered IP address of xxx.xxx.xxx.100 if 30 days have passed since the last access. Further, the rule defines that, for the same registered IP address of xxx.xxx.xxx.100, the determination is performed as to whether the IP address should be deleted from the whitelist if 60 days have passed since the last access. At the timing of FIG. 5, for the IP address xxx.xxx.xxx.100, the communication is permitted because only 24 hours have passed since the last access. The data structure illustrated in FIG. 8 is that of three days after the data structure illustrated in FIG. 5. As illustrated in FIG. 8, for the IP address of xxx.xxx.xxx.100, the communication is still permitted because the user terminal 150 or the user terminal 160 corresponding to the IP address accessed the MFP 110 twenty hours before the timing when the data as illustrated in FIG. 8 is stored.

For another registered IP address of xxx.xxx.xxx.101, a rule is set such that the connection check is started if 30 days have passed since the last access. Further, the rule defines that, for the same registered IP address of xxx.xxx.xxx.101, the determination is performed as to whether the IP address should be deleted from the whitelist if 60 days have passed since the last access. At the timing of FIG. 5, for the IP address xxx.xxx.xxx.101, the check of connection status is in progress because 35 days have passed since the last access. Referring to FIG. 8, the elapsed time for the IP address xxx.xxx.xxx.101 is 38 days because there is no access from the IP address during three days after the timing of FIG. 5. However, because 60 days as the deletion determination check time have not yet elapsed since the last access, the check of connection status is still in progress.

Further, as illustrated in FIG. 5, the same registration deletion rule as that applied to the above two IP addresses is set to the another IP address of xxx.xxx.xxx.114. At the timing of FIG. 5, for the IP address xxx.xxx.xxx.114, the check of connection status is in progress because 59 days have passed since the last access. Referring to FIG. 8, the elapsed time for the IP address xxx.xxx.xxx.114 is 62 days because there is no access from the IP address during three days after the timing of FIG. 5. In this case, because 60 days as the deletion determination check time have already elapsed since the last access, the deletion determination processing based on the response rate is performed.

In an example of FIG. 8, it is assumed that the registration deletion determiner 224 determines that the registered IP address xxx.xxx.xxx.114 is to be deleted from the whitelist based on the response rate. Thus, the user terminal 150 or the user terminal 160 corresponding to the IP address is prohibited to access the MFP 110. It should be noted that although in FIG. 8, the deleted IP address is listed in the table for the sake of explanatory convenience, the IP address may deleted from the list in fact.

Hereinafter, a description is given of processes among each of the modules in the registration deletion determination processing with reference to FIG. 9. FIG. 9 is a sequence diagram illustrating the processes performed among the functional blocks of the MFP 110 in the registration deletion determination processing according to an embodiment of the present invention.

An operation illustrated in FIG. 9 is started in response to an activation of the MFP 110. At S301, the access manager 226 reads out, from the administrator input information 230, one or more IP addresses registered as being permitted to access the MFP 110. At S302, the access manager 226 registers the read-out registered IP address or addresses on the table accessed by the access manager 226 to configure the whitelist listing an IP address or addresses that are permitted to access the MFP 110.

At S303, the external apparatus such as the user terminal 150 and the user terminal 160 transmits data. At S304, the access manager 226 determines whether the IP address of the external apparatus as a communication counterpart from which the data is transmitted is permitted to access the MFP 110. Hereinafter, a description is given of an example in which the IP address of the communication counterpart is present in the whitelist and therefore the communication counterpart is permitted to access the MFP 110. At S305, the access manager 226 records a last access time in association with the registered IP address in the access information 234. In this case, the data is transferred to a predetermined destination via the basic processing unit 212 and a response is appropriately sent back to the external apparatus.

At S401, the schedule manager 222 detects a preset time. At S402, the schedule manager 222 calls the registration deletion determiner 224 to cause the registration deletion determiner 224 to start the determination as to whether to delete the IP address. At S403, the registration deletion determiner 224 reads out the registration deletion rule of each of the IP addresses from the administrator input information 230. At S404, the registration deletion determiner 224 develops the read-out registration deletion rules on the memory.

At S405, the registration deletion determiner 224 reads out the last access time of each of the IP addresses from the access information 234. At S406, the registration deletion determiner 224 updates the device management information 232 with the elapsed time measured for each of the IP addresses. At S407, the registration deletion determiner 224 performs the deletion determination for each of the IP addresses. Hereinafter, a description is given of an example in which the registration deletion determiner 224 determines that a certain IP address is to be deleted from the whitelist.

At S408, the registration deletion determiner 224 deletes an entry of the certain IP address from the administrator input information 230. At S409, the registration deletion determiner 224 notifies the access manager 226 that the entry of the certain IP address is to be deleted. At S410, the access manager 226 updates the whitelist.

Subsequently, at S501, the external apparatus transmits data to the MFP 110. Hereinafter, a description is given of an example in which the external apparatus whose entry of the IP address is deleted at S408 is to access the MFP 110. At S502, the access manager 226 determines whether the IP address of the external apparatus as a communication counterpart from which the data is transmitted is permitted to access the MFP 110. In this case, the access manager 226 determines that the access from the IP address is not permitted.

As described heretofore, according to the present embodiment, an IP address of a communication counterpart that is no longer in use is specified, and determination is made at appropriate time as to whether an access from the communication counterpart corresponding to the specified IP address is to be restricted. In particular, after some time since the registration of IP addresses from which an access is permitted, it becomes difficult for the administrator to distinguish terminals that are still in use from terminals that are no longer in use in a simple manner. According to the present embodiment, an IP address of a communication counterpart that is no longer in use is specified in an efficient manner, and the registration of the IP address of the communication counterpart that is no longer in use is invalidated at appropriate time. This enhances a level of security.

In the embodiment described heretofore, the IP address filtering function is applied to both of the transmission and reception of data. In another embodiment, the IP address filtering function may be applied to the transmission and the reception independently.

Hereinafter, a description is given of the MFP 110 implementing an access management function according to another embodiment with reference to FIG. 10. An embodiment described below is the same or substantially the same as the embodiment described above with reference to FIGS. 1 to 9 except for the administrator input information 230, the device management information 232, and the access information 234. Accordingly, a description is given mainly of the differences between the two embodiments.

FIG. 10A is an illustration of an example data structure of the administrator input information 230 and the device management information 232 stored in the MFP 110 according to another embodiment. As illustrated in FIG. 10A, the administrator input information 230 according to another embodiment includes the registered IP address, the status-check start time, the deletion determination check time, and the condition for the response ratio in substantially the same manner as the data structure illustrated in FIG. 5. By contrast, the device management information 232 includes an elapsed time since the last reception, an elapsed time since the last transmission, permission or disapproval of transmission, and permission or disapproval of reception.

A description is given of an example embodiment in which the device management information 232 includes the permission or disapproval of transmission and the permission or disapproval of reception. However, in a case in which the data structure as illustrated in FIG. 5 is prepared separately for each one of data transmission and data reception, it is determined that an access from a certain IP address is permitted if the certain IP address is registered. Accordingly, in this case, the information indicating the permission or disapproval of transmission and the permission or disapproval of reception may be omitted. In both of the embodiments, the elapsed time and the access permission/disapproval are managed separately for each one of transmission and reception.

FIG. 10B is an illustration of an example data structure of the access information 234 stored in the MFP 110 according to another embodiment. As illustrated in FIG. 10B, the access information 234 includes the registered IP address, a last transmission time, a last reception time, a response counter for transmission, and a response counter for reception. The last transmission time indicates a date and time at which the user terminal 150 or the user terminal 160 last accessed the MFP 110 for data transmission. The last reception time indicates a date and time at which the user terminal 150 or the user terminal 160 last accessed the MFP 110 for data reception. The response counter for transmission holds the total number of trials of a transmission connection check and the number of responses given back from the user terminal 150 or the user terminal 160 to the transmission connection check. The response counter for reception holds the total number of trials of a reception connection check and the number of responses given back from the user terminal 150 or the user terminal 160 to the reception connection check.

In another embodiment, the access manager 226 manages communications between the MFP 110 and the external apparatus separately for each one transmission and reception. In this embodiment, the access manager 226 implements both of an IP filtering function for transmission and an IP filtering function for reception. Accordingly, the access manager 226 determines whether the external apparatus is a permitted communication counterpart for reception when data communication between the MFP 110 and the external apparatus occurs. Further, the access manager 226 determines whether the external apparatus is a permitted communication counterpart for transmission when data communication between the MFP 110 and the external apparatus occurs.

In response to a call from the scheduler manager 222, the registration deletion determiner 224 measures, for each of the IP addresses of communication counterparts, an elapsed time since the last transmission time. Further, the registration deletion determiner 224 measures, for each of the IP addresses of communication counterparts, an elapsed time since the latest reception time. The registration deletion determiner 224 further determines, for each of the registered IP addresses, whether each of the measured elapsed times satisfies the conditions defined in the administrator input information 230 to extract one or more IP addresses that satisfies the conditions. In a case in which an IP address for which the measured elapsed time from the last transmission time exceeds the status-check start time is extracted, the registration deletion determiner 224 requests the access manager 226 to check the connection status. Further, in a case in which an IP address for which the measured elapsed time from the last reception time exceeds the status-check start time is extracted, the registration deletion determiner 224 requests the access manager 226 to check the connection status. The access manager 226 records a result of the connection check in the access information 234 separately for each one of transmission and reception. In a case in which an IP address for which the measured elapsed time from the last transmission time exceeds the deletion determination check time is extracted, the registration deletion determiner 224 determines whether to actually restrict the data transmission from the user terminal 150 or the user terminal 160 corresponding to the extracted IP address to the MFP 110 based on the results of the connection checks performed so far. Further, In a case in which an IP address for which the measured elapsed time from the last reception time exceeds the deletion determination check time is extracted, the registration deletion determiner 224 determines whether to actually restrict the data reception by the user terminal 150 or the user terminal 160 corresponding to the extracted IP address from the MFP 110 based on the results of the connection checks performed so far.

In a specific embodiment, when the registration deletion determiner 224 determines that data transmission from the MFP 110 to the user terminal 150 or the user terminal 160 corresponding to the extracted IP address should be restricted, the registration deletion determiner 224 deletes the IP address from the whitelist for transmission to restrict the data transmission. Further, when the registration deletion determiner 224 determines that data reception at the user terminal 150 or the user terminal 160 corresponding to the extracted IP address from the MFP 110 should be restricted, the registration deletion determiner 224 deletes the IP address from the whitelist for reception to restrict the data reception. The registration deletion determiner 224 may request the administrator to confirm whether to restrict the communication between the MFP 110 and the user terminal 150 or 160 corresponding to the IP address for which the determiner 250 determines not to restrict the communication as a connection status is confirmed.

As described heretofore, according another embodiment, both of the whitelist for data transmission and the whitelist for data reception are prepared, and the measurement of elapsed time, the extraction of IP address for which the measured elapsed time satisfies the conditions, and the determination as to whether to restrict the communication are performed separately for each one of data transmission and data reception. Thus, the more detailed IP address filtering function enables more detailed determination as to whether the registered IP address is to be deleted.

Figure 11:
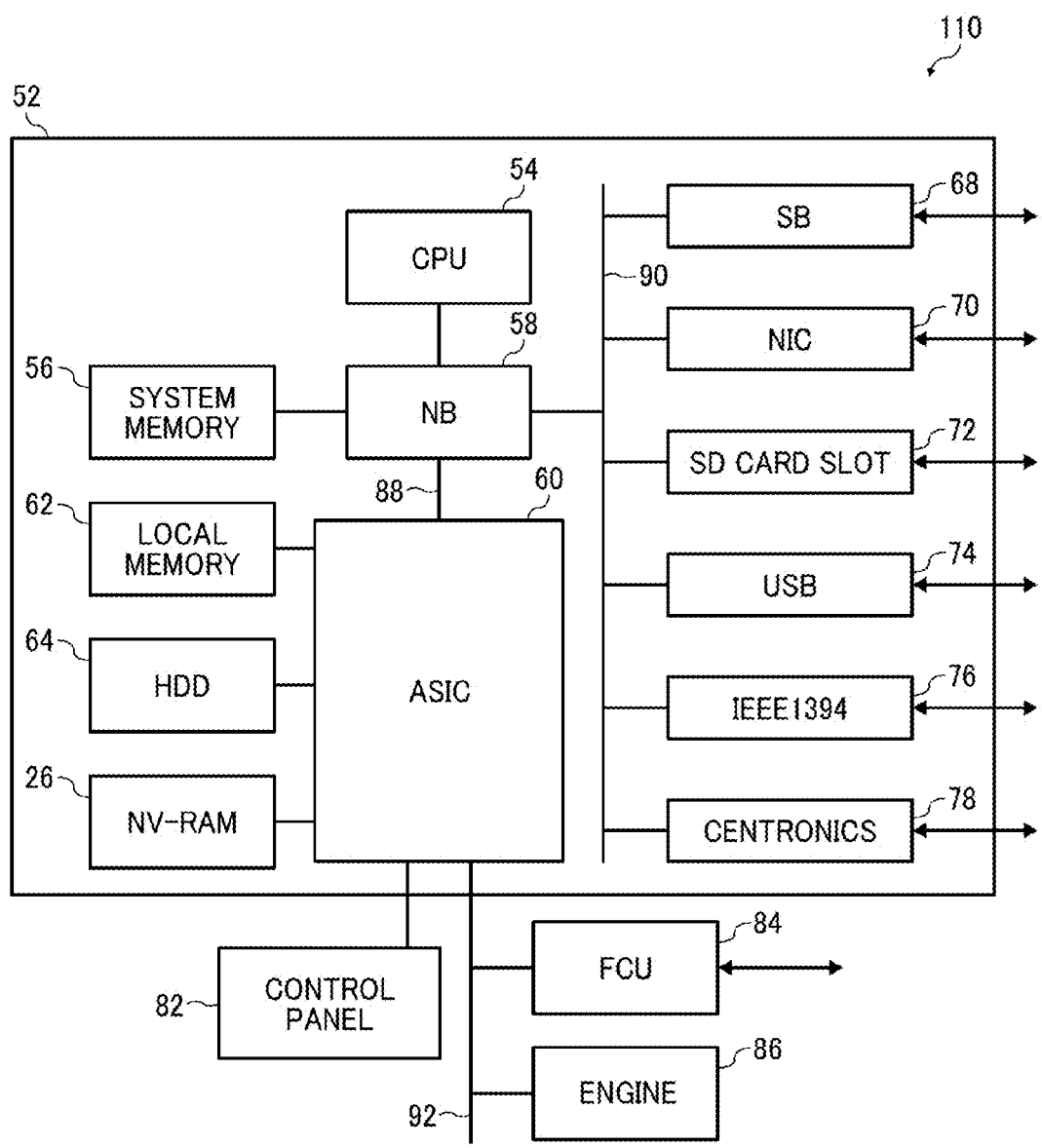
FIG. 11 is a block diagram illustrating a hardware configuration of the MFP according to an embodiment of the present invention.

Hereinafter, a description is given of a hardware configuration of the MFP 110 according to one or more embodiments with reference to FIG. 11. FIG. 11 is a block diagram illustrating a hardware configuration of the MFP 110. The MFP 110 includes a controller 52, a control panel 82, a facsimile control unit (FCU) 84, and an engine 86. The controller 52 includes a central processing unit (CPU) 54, a north bridge (NB) 58, an application specific integrated circuit (ASIC) 60 connected to the CPU 54 via the NB 58, and a system memory 56. The ASIC 60 is connected to the NB 58 via an accelerated graphic port (AGP) 88. The ASIC 60 performs various types of image processing. The system memory 56 is used as a memory for drawing.

The ASIC 60 is connected to a local memory 62, a hard disc drive (HDD) 64, a nonvolatile memory (NV-RAM) 66 such as a flash memory. The local memory 62 is used as a buffer for image data to be copied or a buffer for data to be coded. The HDD 64 is a storage storing image data, document data, programs, font data, form data, etc. The NV-RAM 66 according to the present embodiment provides a storage area for storing programs for controlling the MFP 110, various types of system information, the administrator input information 230, the device management information 232, and the access information 234.

The controller 52 further includes a south bridge (SB) 68, a network interface card (NIC) 70, a secured digital (SD) card slot 72, an universal serial bus (USB) interface 74, an IEEE 1394 interface 76, and a Centronics interface 78, which are connected to the NB 58 via a peripheral component interconnect (PCI) bus 90. The SB 68 is a bridge to connect the NB 58 with a read only memory (ROM), PCI bus peripheral devices, etc. The NIC 70 is an interface device to connect the MFP 110 to the network 102 such as the Internet and a local area network (LAN). The SD card slot 72 mounts a SD card that is removable. The USB interface 74, the IEEE interface 76, and the Centronics interface 78 are interfaces that are in compliance with the USB standard, the IEEE standard, and the Centronics standard, respectively. These interfaces accept printing jobs, etc.

The control panel 82 implements the operation unit 218. The control panel 82 is connected to the ASIC 60 of the controller 52. The control panel 82 accepts various instruction inputs from an operator and provides a user interface to perform a screen display. The control panel 82 may include a display, a keyboard, and a mouse. Alternatively, the control panel may be constituted by a touch panel. The FCU 84 and the engine 86 is connected to the ASIC 60 via a PCI bus 92. The FCU 84 performs communications via the G3 and/or G4 facsimile protocol. The engine 86 receives print instructions or scan instructions issued by an application and performs image formation or image scanning. The engine 86 constitutes the scanner unit 214 and the print unit 216.

The MFP 110 according to the present embodiment reads out a control program from the HDD 64 or the NV-RAM 66 and expands the control program to a work area provided by the system memory 56 or the local memory 62 to implement each of functional blocks and operations described above, under control of the CPU 54.

As described heretofore, according to the above-described embodiments, identification information of a communication counterpart that is no longer in use is specified in an effective manner, and determination is made at appropriate time as to whether an access from the communication counterpart corresponding to the specified identification information is to be restricted.

This configuration enables a timely invalidation of the use permission given to a terminal that is no longer in use. Accordingly, a level of network security for the MFP 110 is improved.

A description is given heretofore of an example in which a filtering function is implemented by the IP address filtering function using an IP address as identification information. However, the identification information used for the filtering function may be any other suitable information of another layer such as a media access control (MAC) address.

The functional blocks as described above are implemented by a computer-executable program written by programming languages such as an assembler language, C, and object-oriented programming languages such as C++, C#, and Java (registered trademark). The program may be distributed via a telecommunication line or as being stored in a computer-readable storage medium such as a ROM, an electrically erasable and programmable read only memory (EEPROM), an electrically programmable read only memory (EPROM), a flash memory, a flexible disk, a compact disc read only memory (CD-ROM), a compact disc rewritable (CD-RW), a digital versatile disk (DVD)-ROM, a DVD-RAM, a DVD-RW, a Blu-ray disc, an SD card, and a magneto-optical disc (MO).

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information apparatus to communicate with one or more communication counterparts, the apparatus comprising:
   a memory to store an elapsed time condition in association with identification information for each of the one or more communication counterparts; and
   circuitry to:
   measure an elapsed time from the last time when communication took place with the communication counterpart for each of the one or more communication counterparts;
   extract identification information for which the measured elapsed time satisfies the elapsed time condition stored in the memory; and
   determine whether to restrict communications between the information apparatus and at least one of the communication counterparts corresponding to the extracted identification information.

2. The information apparatus of claim 1, wherein
   in the extracting the identification information, the circuitry extracts identification information for which the measured elapsed time reaches a first time and identification information for which the measured elapsed time reaches a second time that is later than the first time, and the circuitry is further configured to:

record a connection check result indicating a response from the communication counterpart in response to a connection check transmitted from the information apparatus, the communication counterpart corresponding to the extracted identification information for which the measured elapsed time reaches the first time; and determine whether to restrict communications between the information apparatus and the communication counterpart corresponding to the extracted identification information for which the elapsed time reaches the second time based on the connection check result.

3. The information apparatus of claim 2, wherein the circuitry is further configured to send, to a terminal, a request requesting confirmation of whether to restrict communications between the information apparatus and the communication counterpart corresponding to the identification information for which the circuitry determines not to restrict communications with the information apparatus.

4. The information apparatus of claim 2, wherein the request for connection check includes one or more trials for establishing communication being addressed to the extracted identification information for which the elapsed time reaches the first time, and the connection check result is based on a number of the trials of communication and a number of successful communications.

5. The information apparatus of claim 1, wherein the circuitry is further configured to delete the identification information for which the circuitry determines not to restrict communications with the information apparatus from permission information, the permission information including identification information of at least one of the one or more communication counterparts to and from which the information apparatus accept data communication.

6. The information apparatus of claim 5, wherein the permission information further includes transmission permission information indicating at least one of the one or more communication counterparts that transmission of data to the information apparatus is permitted, and reception permission information indicating at least one of the one or more communication counterparts that reception of data from the information apparatus is permitted, and the circuitry performs the measurement of the elapsed time, the extraction of the identification information for which the measured elapsed time satisfies the elapsed time condition, and the determination as to whether to restrict the communications separately for each one of data transmission and data reception.

7. The information apparatus of claim 5, wherein the identification information includes an Internet protocol address and the permission information includes a whitelist for an Internet protocol address filtering.

8. The information apparatus of claim 1, wherein the elapsed time condition is set for respective ones of the one or more communication counterparts or set collectively for a part of or all of the one or more communication counterparts.

9. The information apparatus of claim 1, wherein the circuitry is further configured to manage whether to allow communication of data or delete the data, and in response to an occurrence of communication of data, to record identification information identifying at least one of the communication counterparts to which the data is addressed and a time at which the data is communicated.

10. A method of managing communications between an information apparatus and one or more communication counterparts, the method comprising:

reading out an elapsed time condition that is associated with identification information of each of the one or more communication counterparts;

measuring an elapsed time from a last time when communication took place with the communication counterpart for each one of the one or more communication counterparts;

extract identification information for which the measured elapsed time satisfies the read-out elapsed time condition; and determine whether to restrict communications between the information apparatus and at least one of the communication counterparts corresponding to the extracted identification information.

11. The method of claim 10, wherein the extracting the identification information includes extracting identification information for which the measured elapsed time reaches a first time and extracting identification information for which the measured elapsed time reaches a second time that is later than the first time, the method further includes recording a connection check result indicating a response from the communication counterpart in response to a connection check transmitted from the information apparatus, the communication counterpart corresponding to the extracted identification information for which the measured elapsed time reaches the first time, and the determining whether to restrict communications includes determining whether to restrict communications between the information apparatus and the communication counterpart corresponding to the extracted identification information for which the elapsed time reaches the second time based on the connection check result.

12. The method of claim 10, further comprising deleting the identification information for which the determining determines that the communications with the information apparatus is to be restricted from permission information, the permission information including identification information of at least one or more communication counterparts to and from which the information apparatus accept data communication.

13. The method of claim 10, wherein the elapsed time condition is set for respective ones of the one or more communication counterparts or set collectively for a part of or all of the one or more communication counterparts.

14. The method of claim 10, further comprising managing whether allow communication of data or delete the data, wherein the managing includes recording, in response to an occurrence of communication of data, identification information identifying at least one of the one or more communication counterparts to which the data is addressed and a time at which the data is communicated.

15. A non-transitory computer-readable storage medium storing a computer-executable program that, when executed, causes an information apparatus for communicating with one or more communication counterparts to perform a method comprising:

storing an elapsed time condition in association with identification information for each of the one or more communication counterparts; and measuring an elapsed time from the last time when communication took place with the communication counterpart for each of the one or more communication counterparts;

extracting identification information for which the measured elapsed time satisfies the elapsed time condition; and determining whether to restrict communications between the information apparatus and at least one of the communication counterparts corresponding to the extracted identification information.

16. The non-transitory computer-readable storage medium of claim 15, wherein the extracting the identification information includes extracting identification information for which the measured elapsed time reaches a first time and extracting identification information for which the measured elapsed time reaches a second time that is later than the first time, the method further includes recording a connection check result indicating a response from the communication counterpart in response to a connection check transmitted from the information apparatus, the communication counterpart corresponding to the extracted identification information for which the measured elapsed time reaches the first time, and the determining whether to restrict communications includes determining whether to restrict communications between the information apparatus and the communication counterpart corresponding to the extracted identification information for which the elapsed time reaches the second time based on the connection check result.

17. The non-transitory computer-readable storage medium of claim 15, wherein the method further comprising deleting the identification information for which the determining determines that the communications with the information apparatus is to be restricted from permission information, the permission information including identification information of at least one or more communication counterparts to and from which the information apparatus accept data communication.

18. The non-transitory computer-readable storage medium of claim 15, wherein the elapsed time condition is set for respective ones of the one or more communication counterparts or set collectively for a part of or all of the one or more communication counterparts.

19. The non-transitory computer-readable storage medium of claim 15, wherein the method further comprising managing whether allow communication of data or delete the data, wherein the managing includes recording, in response to an occurrence of communication of data, identification information identifying at least one of the one or more communication counterparts to which the data is addressed and a time at which the data is communicated.

* * * * *